(12) United States Patent
Lam

(10) Patent No.: US 9,311,822 B2
(45) Date of Patent: Apr. 12, 2016

(54) INTERACTIVE PUZZLE BOOK ASSEMBLY

(71) Applicant: Leo Paper Bags Manufacturing (1982) Limited, Kowloon (HK)

(72) Inventor: Cannie Lam, Kowloon (HK)

(73) Assignee: Leo Paper Bags Manufacturing (1982) Limited, Kowloon, Hong Kong (CN)

( * ) Notice: Subject to any disclaimer, the term of this patent is extended or adjusted under 35 U.S.C. 154(b) by 256 days.

(21) Appl. No.: 13/665,929

(22) Filed: Oct. 31, 2012

(65) Prior Publication Data
US 2014/0120799 A1 May 1, 2014

(51) Int. Cl.
*A63H 33/38* (2006.01)
*G09B 1/06* (2006.01)
*G09B 5/06* (2006.01)

(52) U.S. Cl.
CPC ... *G09B 1/06* (2013.01); *G09B 5/06* (2013.01)

(58) Field of Classification Search
USPC ............... 434/188, 201, 178, 308, 309, 317; 273/153 R, 237, 238; 446/14–152
See application file for complete search history.

(56) References Cited

U.S. PATENT DOCUMENTS

| | | | | | |
|---|---|---|---|---|---|
| 2,862,309 | A | * | 12/1958 | Der et al. | G06B 17/00 273/157 R |
| 2,946,137 | A | * | 7/1960 | Worth | A63H 33/38 283/46 |
| 3,015,895 | A | * | 1/1962 | Stall | G09B 17/003 273/157 R |
| 3,280,499 | A | * | 10/1966 | Studen | A63F 9/10 273/156 |
| 4,176,473 | A | * | 12/1979 | Rae | A63H 33/22 281/15.1 |
| 4,356,358 | A | * | 10/1982 | Fukukura | H01H 13/702 200/292 |
| 4,417,732 | A | * | 11/1983 | Guill | A63F 9/10 273/157 R |
| 4,487,585 | A | * | 12/1984 | Goldwasser | A63F 9/10 273/156 |
| 4,607,147 | A | * | 8/1986 | Ono | H01H 13/702 200/292 |
| 4,609,356 | A | * | 9/1986 | Gilden | A63F 9/0666 434/259 |
| 4,703,573 | A | * | 11/1987 | Montgomery | B42D 1/007 40/124.03 |
| 4,822,051 | A | * | 4/1989 | Nowak | A63F 9/10 273/157 R |
| 4,893,817 | A | * | 1/1990 | Shilo | 273/157 R |
| 5,087,043 | A | * | 2/1992 | Billings | A63F 9/10 273/157 R |
| 5,165,894 | A | * | 11/1992 | Reasoner | G09B 17/00 434/345 |
| 5,167,508 | A | * | 12/1992 | Mc Taggart | B42D 1/006 362/98 |
| 5,188,533 | A | * | 2/1993 | Wood | G09B 1/06 434/111 |
| 5,277,588 | A | * | 1/1994 | Lin | A63F 3/0421 434/169 |
| 5,356,296 | A | * | 10/1994 | Pierce | G09B 5/062 434/317 |

(Continued)

OTHER PUBLICATIONS

European Search Report; EP Patent Application No. 13191114.1; Mailed Mar. 6, 2014; 7 pages.

*Primary Examiner* — Gene Kim
*Assistant Examiner* — Matthew B Stanczak
(74) *Attorney, Agent, or Firm* — Perkins Coie LLP

(57) ABSTRACT

An interactive book assembly has first and second page portions, and a plurality of uniquely-shaped workpieces. The first page portion removably retains the workpieces in a plurality of first receiving areas. The second page portion has a plurality of second receiving areas that have unique shapes that each match a respective one of the workpieces so as to receive and retain a mating. Each second receiving area has a switch area located to correspond to the position of an indicia area of the mating workpiece when the mating workpiece is positioned in the respective second receiving area. Membrane switches are positioned adjacent to a switch area of each second receiving area to align with the indicia area of the workpiece inserted into the matching second receiving area. When a reader presses the activation indicium on the workpiece, the workpiece will press against the switch area, causing activation of the associated membrane switch and generation of a sound relating to the workpiece.

21 Claims, 14 Drawing Sheets

(56) References Cited

U.S. PATENT DOCUMENTS

| | | | | |
|---|---|---|---|---|
| 5,364,272 A * | 11/1994 | Herman | G09B 5/06 200/5 R |
| 5,511,980 A * | 4/1996 | Wood | G09B 1/04 434/157 |
| 5,628,513 A * | 5/1997 | Soriano | A63F 9/10 273/157 R |
| 5,645,432 A * | 7/1997 | Jessop | A63F 3/00643 434/308 |
| 5,674,075 A * | 10/1997 | Sherman | 434/188 |
| 5,813,861 A * | 9/1998 | Wood | G09B 1/04 434/167 |
| 5,823,532 A * | 10/1998 | Goldwasser | A63F 9/1044 273/157 A |
| 5,895,219 A * | 4/1999 | Miller | G09B 17/00 283/46 |
| 5,910,009 A * | 6/1999 | Leff | G09B 21/00 434/236 |
| 5,980,354 A * | 11/1999 | Prest | A63H 33/38 434/171 |
| 6,030,225 A * | 2/2000 | Chan | G09B 1/06 434/156 |
| 6,041,215 A * | 3/2000 | Maddrell et al. | 434/317 |
| 6,132,216 A * | 10/2000 | Muntean et al. | 434/191 |
| 6,146,146 A * | 11/2000 | Koby-Olson | 434/159 |
| 6,641,170 B2 * | 11/2003 | Yip | B42D 1/00 281/29 |
| 6,726,485 B2 * | 4/2004 | Marcus | G09B 1/06 434/156 |
| 6,729,881 B2 * | 5/2004 | Marcus | G09B 1/06 434/116 |
| 6,739,874 B2 * | 5/2004 | Marcus | G09B 1/06 273/237 |
| 6,755,655 B2 * | 6/2004 | Marcus | G09B 1/06 434/116 |
| 6,968,151 B2 * | 11/2005 | Redford et al. | 434/307 R |
| 6,979,245 B1 * | 12/2005 | Goodwin | A63F 9/10 273/153 S |
| 7,006,786 B2 * | 2/2006 | Marcus | G09B 1/06 434/159 |
| 7,018,213 B2 * | 3/2006 | Marcus | G09B 1/06 434/156 |
| 7,203,455 B2 * | 4/2007 | Ernst | G09B 5/06 345/173 |
| 7,217,135 B2 * | 5/2007 | Marcus | G09B 1/06 434/156 |
| 7,224,934 B2 * | 5/2007 | Mullen | 434/317 |
| 7,234,941 B2 * | 6/2007 | Shuler | G09B 5/062 434/159 |
| 7,294,060 B2 * | 11/2007 | Ferrigno et al. | 463/43 |
| 7,347,760 B2 * | 3/2008 | Wood | A63H 30/00 434/159 |
| 7,402,042 B2 * | 7/2008 | Kelley et al. | 434/178 |
| 7,585,216 B2 * | 9/2009 | Foster | A63F 9/10 463/9 |
| 7,993,139 B2 * | 8/2011 | Lehmann | G09B 1/30 434/160 |
| 2002/0197589 A1 * | 12/2002 | Wood | G09B 19/02 434/201 |
| 2003/0139113 A1 * | 7/2003 | Wood et al. | 446/175 |
| 2003/0162160 A1 | 8/2003 | Horchler et al. | |
| 2004/0142311 A1 * | 7/2004 | Marcus | G09B 1/06 434/156 |
| 2004/0146843 A1 * | 7/2004 | Marcus | G09B 1/06 434/307 R |
| 2004/0146844 A1 * | 7/2004 | Marcus | G09B 1/06 434/307 R |
| 2004/0173447 A1 | 9/2004 | Lee | |
| 2008/0113321 A1 * | 5/2008 | Kelley et al. | 434/169 |
| 2008/0145823 A1 * | 6/2008 | Shuler | G09B 5/062 434/159 |
| 2009/0081624 A1 | 3/2009 | Chien et al. | |
| 2010/0032899 A1 * | 2/2010 | Gearty | A63F 9/10 273/157 R |
| 2010/0227525 A1 * | 9/2010 | Smith | A63H 33/38 446/149 |

* cited by examiner

INTERACTIVE PUZZLE BOOK ASSEMBLY

TECHNICAL FIELD

Embodiments of the present invention are directed to interactive book assemblies.

BACKGROUND

Children's books are often designed to induce children to read, as well as to keep a child's interest throughout the book. For example, children's books come in a variety of shapes, sizes, and styles, and have been designed with, among other things, decorative and colorful covers, bright illustrations, scratch and sniff areas, pop-up figures, and lift-up flaps. Many of these features in the books are designed to make the books more appealing to youthful readers and to teach children new skills, such as dexterity, memory, or imagination and reasoning.

Developing children continuously learn new cognitive and physical skills. Books have been recognized as helping children with letter and word recognition, as well as improving their small motor skills. The more interactive the user is with a book, both on a cognitive level and with being able to physically manipulate portions of the book, the greater opportunity there is for the user to learn on a variety of levels.

SUMMARY

The present invention provides an interactive book assembly that overcomes drawbacks experienced in the prior art and provides other benefits. At least one embodiment provides an interactive puzzle book assembly having first and second page portions and a plurality of workpieces. Each workpiece has a unique shape or size compared to the other workpieces, and each workpiece has an indicia area with a first activation indicia thereon. A plurality of switches are operatively coupled the second page portion, and an electronics package is operatively coupled to the switches. The first page portion removably retains the workpieces in a plurality of first receiving areas, and each first receiving area has a unique shape or size as compared to the other first receiving areas. The second page portion has a plurality of second receiving areas, and each second receiving area has a unique shape or size as compared to the other second receiving areas. Each second receiving area has a shape and size that matches a respective one of the first receiving area, and each second receiving area receives and retains a mating one of the workpieces. Each second receiving area has a switch area located to correspond to the position of the indicia area of the mating workpiece when the mating workpiece is positioned in the respective second receiving area. The switches are positioned with a switch adjacent to the switch area of each second receiving area. When a workpiece is placed in its mating second receiving area, the switch associated with the mating second receiving area is aligned with the indicia area. When a user presses the activation indicium, the workpiece will press against the switch area, causing activation of the associated switch. The electronic package generates a sound relating to the workpiece in the second receiving area corresponding to the associated switch.

Another embodiment provides an interactive book assembly that has a plurality of workpieces, wherein each workpiece has a unique shape and size different than the other workpieces. Each workpiece has an indicia area with a first activation indicium thereon. A first page of the book assembly has a plurality of first receiving areas each having a shape and size that corresponds to the shape and size of a respective one of the workpieces, wherein each first receiving area matches only one of the workpieces. A second page has a plurality of second receiving areas that each have a shape and size that corresponds to the shape and size of a respective one of the workpieces. Each second receiving area matches only one of the workpieces, and each workpiece mates with one first receiving area and one second receiving area. Each second workpiece receives a mating workpiece removed from the matching first receiving area. Each second receiving area has a switch area positioned to be aligned with the activation indicator on the mating workpiece when the mating workpiece is positioned in the matching second receiving area.

A plurality of membrane switches is connected to the second page adjacent to the second receiving areas. Each membrane switch is positioned adjacent to the switch area of a respective one of the second receiving area. When a mating workpiece is placed the matching second receiving area, the membrane switch associated with the matching second receiving area is aligned with the indicia area. When a user presses the activation indicium, the workpiece presses against the switch area and activates the associated membrane switch. An electronic package is coupled to the plurality of membrane switches. The electronic package has a processor, a speaker, power source, and a secondary interaction member operatively coupled to the processor and the membrane switches. The electronic package generates a selected sound upon activation of the associated membrane switch, and the secondary interaction member provides a visual display related to the workpiece located in the second receiving area associated with the activated membrane switch.

Another embodiment provides an interactive book assembly having a plurality of workpieces, each having a unique shape and size different than the other workpieces, and each workpiece has activation indicium thereon. A first page portion of the book assembly has a plurality of first receiving areas that releasably contain the workpieces. A second page portion has a plurality of second receiving areas that each have a shape and size that corresponds to the shape and size of a respective one of the workpieces. Each second receiving area matches with only one of the workpieces, and each second receiving area is configured to receive and releasably retain a mating workpiece.

A plurality of membrane switches is connected to the second page adjacent to the second receiving areas, and each membrane switch is positioned relative to the respective one of the second receiving areas to be aligned with activation indicium on the mating workpiece when a mating workpiece is placed the matching second receiving area. When a user presses the activation indicium on the mating workpiece, the mating workpiece activates the associated membrane switch. An electronic package is coupled to the plurality of membrane switches, and the electronic package generates a selected sound upon activation of the associated membrane switch. A secondary interaction member is operatively connected to the membrane switches and the electronic package. The secondary interaction member provides at least one of an audible, visual, or tactile interactive response related to activation of the associated membrane switch.

DETAILED DESCRIPTION

The present disclosure describes an interactive puzzle book assembly in accordance with certain embodiments of the present disclosure. Several specific details of the embodiments are set forth in the following description and the Figures to provide a thorough understanding of certain embodiments of the invention. One skilled in the art, however, will understand that the present invention may have additional embodiments, and that other embodiments of the invention may be practiced without several of the specific features described below.

Figure 1:
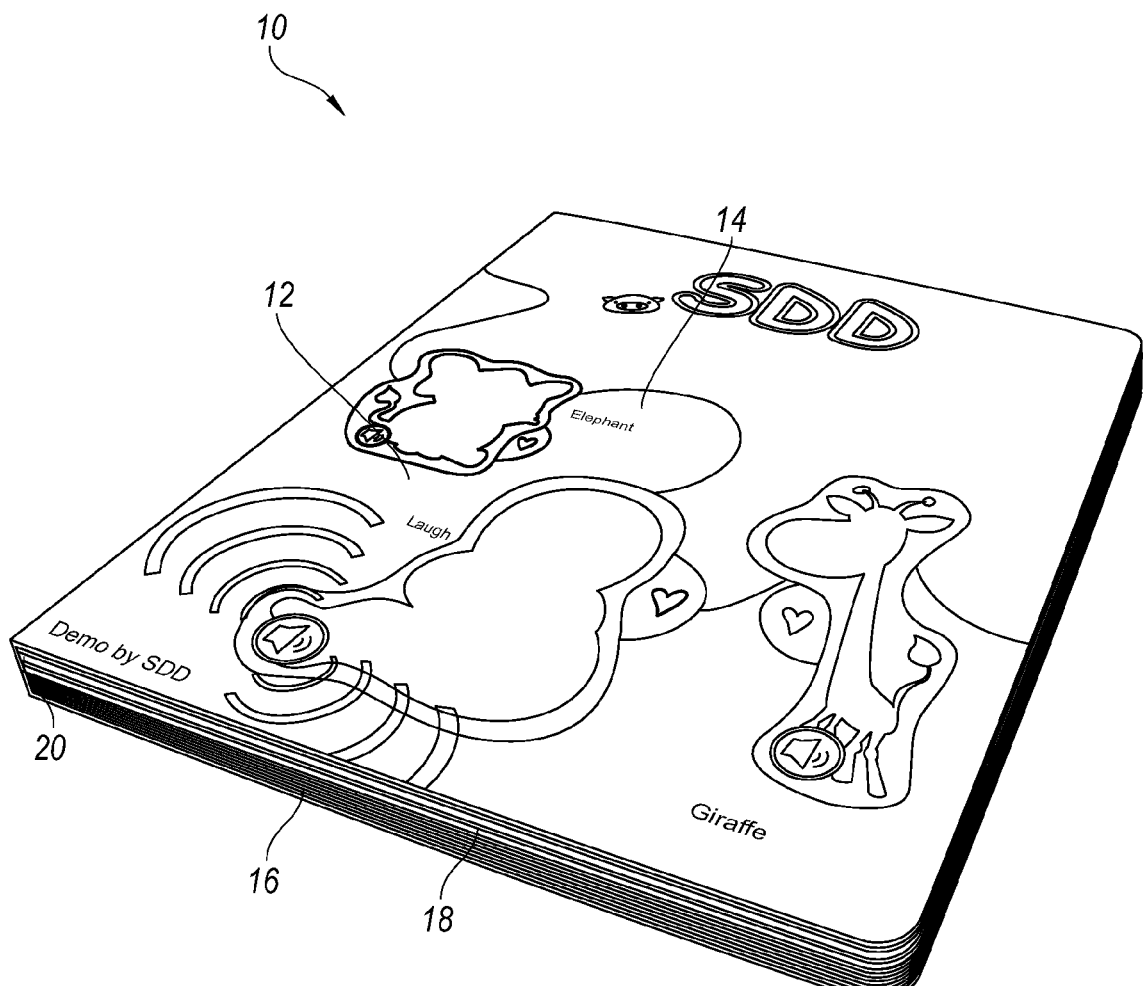
FIG. 1 is an isometric view of an interactive book assembly in accordance with an embodiment of the present invention, wherein the book is shown in a closed position.
Figure 2:
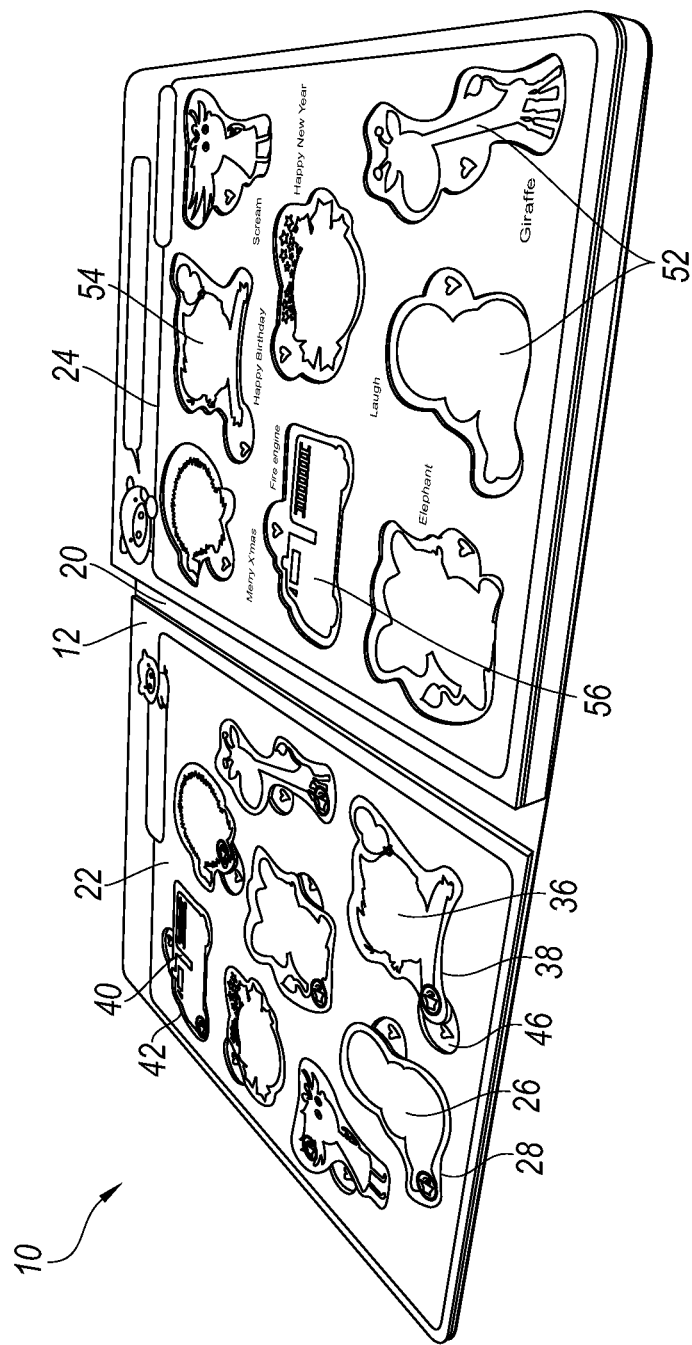
FIG. 2 is an isometric view of the interactive book assembly of FIG. 1 shown in an open position.

An interactive book assembly 10 in accordance with an embodiment of the present disclosure is illustrated in FIGS. 1 and 2. The book assembly 10 includes a book 12 having a front cover 14, a rear cover 16, and a plurality of pages 18 interconnected by a binding or spine 20. The front cover 14 can be moved between a closed portion (FIG. 1) and an open position (FIG. 2). When the book 12 is in the open position, at least first and second pages 22 and 24 are exposed so as to be viewable and accessible by a reader. The book 12 of the illustrated embodiment is shown as an interactive puzzle book, although other embodiments can provide interactive books within the scope of this disclosure directed to other content. The book 12 includes a plurality of workpieces 26 moveable between receiving areas 28 and 52 on the first and second pages 22 and 24, respectively.

Figure 3:
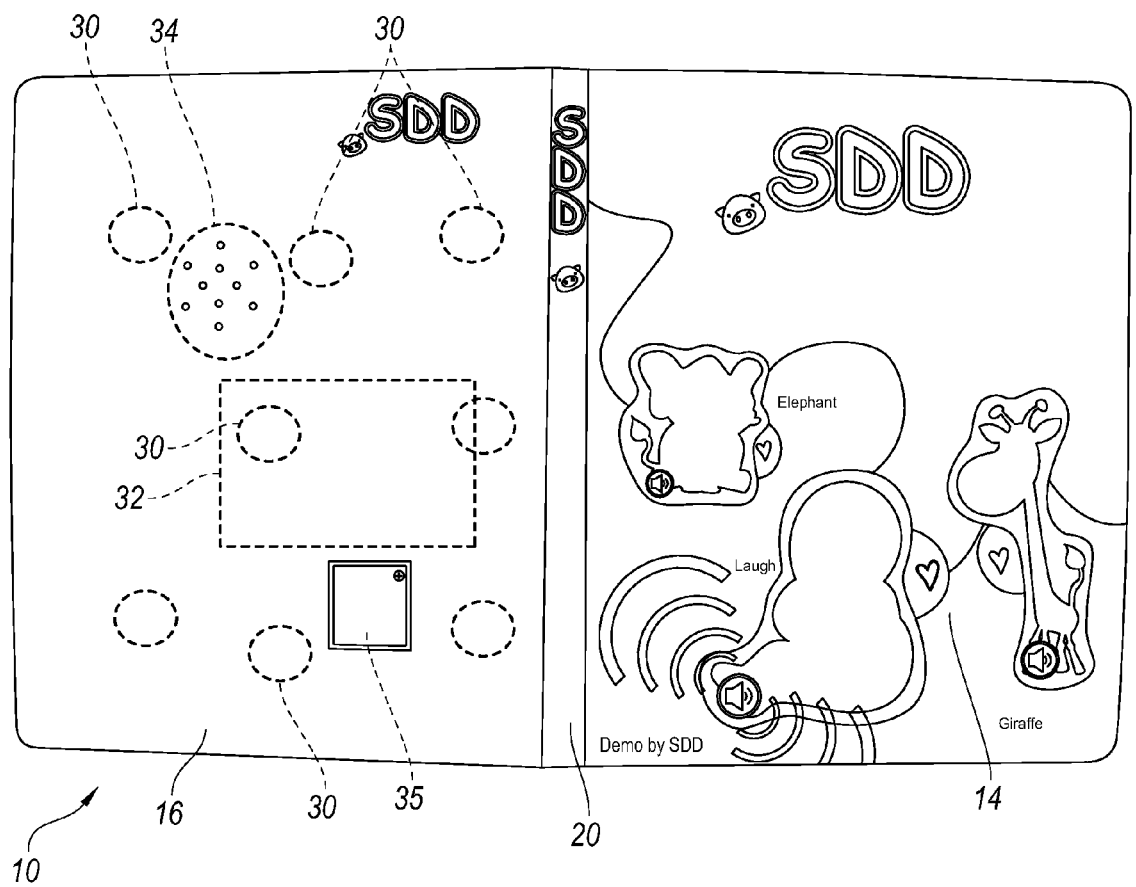
FIG. 3 is a rear view of the interactive book assembly of FIG. 2 in the open position.

As seen in FIGS. 2 and 3, the book 12 also includes a plurality of membrane switches 30 embedded in the second page 24 adjacent to the receiving areas 28 in the second page. The membrane switches 30 are operatively connected to an electronic package 32 that includes circuitry, a processor, a speaker 34, and a battery 35 or other power source. As discussed in greater detail below, when the reader places a workpiece 26 in a mating receiving area 28 in the second page 24, indicium 36 on the workpiece is aligned with the membrane switch 30 associated with the receiving area 28. When the reader presses on the indicium 36, the membrane switch 30 is activated, which results the electronic package generating a sound via the speaker 34. The electronic package 32 may also be configured to generate other visual or tactile feedback to the reader or to perform a predetermined function in response to activation of a selected membrane switch 30. This audible, visual, and/or tactile response, or feedback to the reader, in combination with manipulation of the workpieces 26 between the first and second pages 22 and 24, provides for a more stimulating interactive experience with the book assembly 10.

Figure 4:
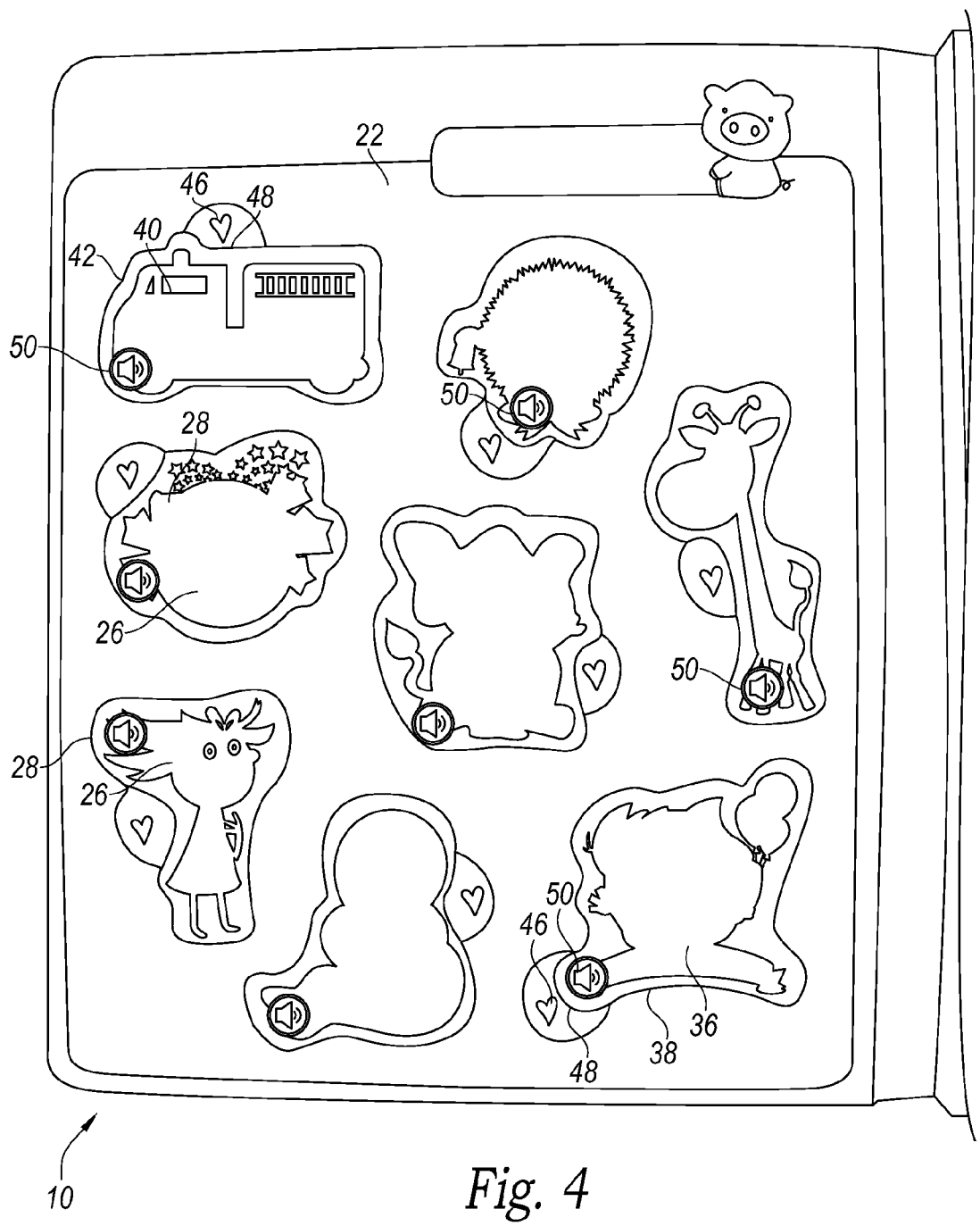
FIG. 4 is a schematic view of a selected first page of the interactive book assembly of FIG. 2, wherein a plurality of uniquely shaped workpieces are shown positioned in mating receiving areas.

As best seen in FIG. 4, the first page 22 of the book 12 includes a plurality of the receiving areas 28 each having a unique shape different from the other receiving areas on the first page. Each receiving area 28 is associated with a mating workpiece 26 having a peripheral shape that substantially matches the shape of the mating receiving area. In the illustrated embodiment, the workpieces 26 are puzzle pieces that include an image, graphics, or the like on the surface of the puzzle piece. For example, a first puzzle piece 36 shown in a mating first receiving area 38 in the lower right-hand corner of the first page 22 includes an image and words relating to a "Happy Birthday" theme. This first puzzle piece 36 is releasably retained in the first receiving area 38 by a friction fit while allowing the reader to selectively remove the puzzle piece 36 from the first receiving area 38. A second puzzle piece 40 is shown in a mating second receiving area 42 in the upper left-hand corner of the first page 22. The second puzzle piece 40 includes a graphic or image of a fire truck and has a peripheral shape that is different than the peripheral shape of the first puzzle piece 36. Similarly, the second puzzle piece 40 is releasably retained in a second receiving area 42 by a friction fit, and the second puzzle piece 40 has a shape different than the shape of the first receiving area 38. Accordingly, the first puzzle piece 36 will not fit in the second receiving area, and the second puzzle piece 40 will not fit in the first receiving area 38. The first page 22 illustrated in FIG. 4 includes eight puzzle pieces or workpieces 26, although other embodiments can have a greater or lesser number of workpieces. Each workpiece 26 has a unique peripheral shape, and each is releasably retained in a mating receiving area 28 that also has a unique shape as compared to the other receiving areas 28 on the first page 22.

In the illustrated embodiment, each receiving area 28 also has an access portion 46 at least partially spaced away from the corresponding mating workpiece 26. This access portion 46 in the illustrated embodiment is formed by a cutout in the first page that defines a recess and that exposes a selected edge portion 48 of the workpiece 26. This access portion 46 allows the reader to place the tip of his or her finger into the access portion to engage the edge portion 48 of the workpiece 26, so as to lift or otherwise remove the workpiece from the corresponding receiving area 28. The first page 22 can include indicia in the access portion 46 that provides a visual indicator to the reader as to where to access the workpiece 26 for removal from the mating receiving area 28. Other embodiments can use other cutouts or other features that allow for easy and convenient removal of each workpiece 26 from its corresponding receiving area 28.

Each workpiece 26 also includes an activator indicium 50 on a portion of the workpiece, typically positioned near a corner or edge portion. In the illustrated embodiment, the activator indicium 50 is a graphical image of a speaker within a circle, and each workpiece 26 includes the same activator indicium 50. In other embodiments, other activator indicia 50 can be provided on the workpieces. The activator indicium 50 can be a visual indicator and/or a tactile indicator. The activator indicium 50 can be the same or can be different for some or all of the workpieces 28.

Figure 5:
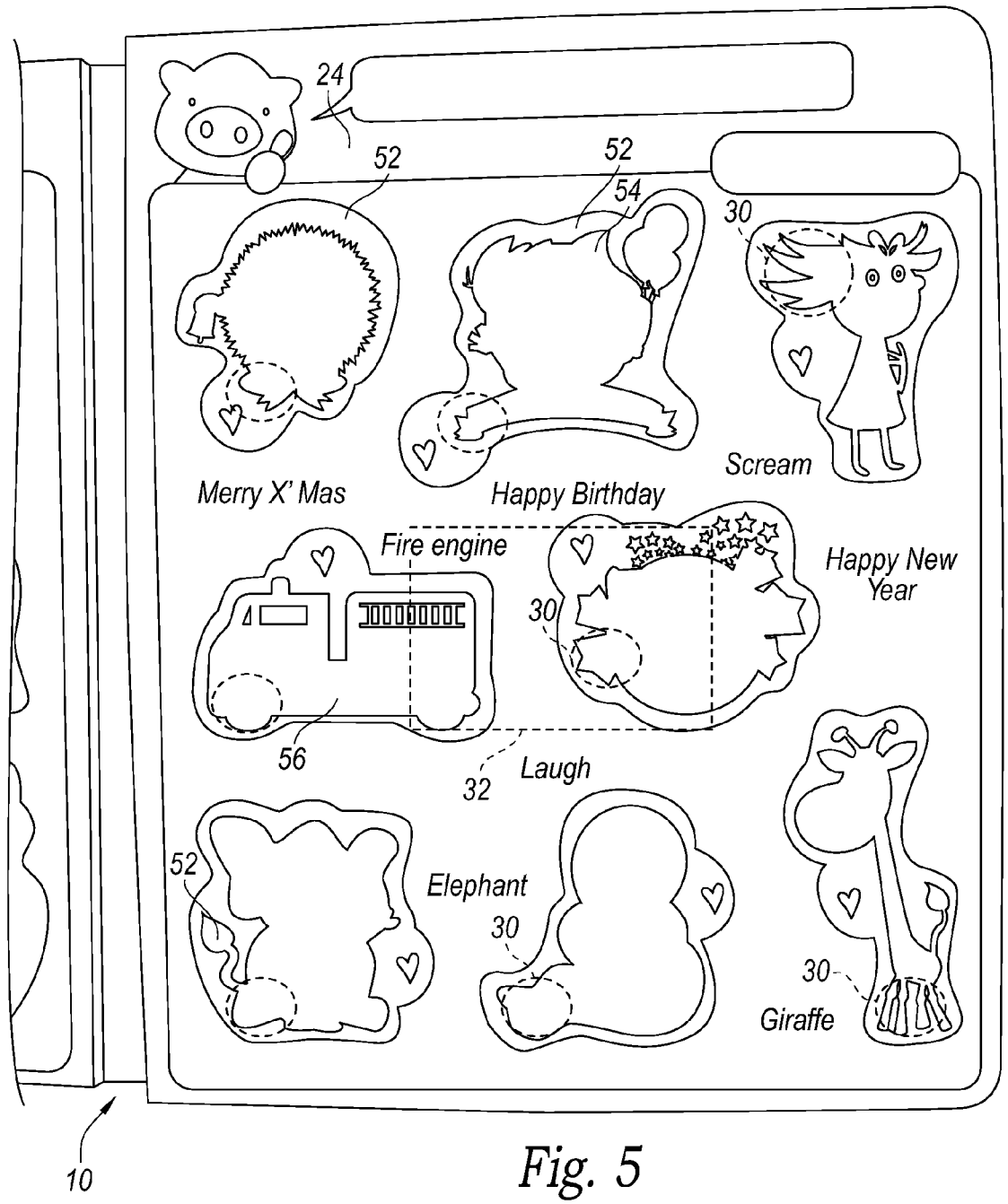
FIG. 5 is a schematic view of a second page of the interactive book assembly of FIG. 2, wherein the page has a plurality of uniquely shaped receiving areas shaped to correspond with and receive the workpieces.

As seen in FIG. 5, the second page 24 of the book 12 includes a plurality of receiving areas 52 formed therein. Each receiving area 52 on the second page 24 has a peripheral shape that substantially corresponds with a respective one of the receiving areas 28 on the first page 22. Accordingly, each receiving area 52 has a unique shape as compared to the other receiving areas 52 on the second page 24. Each of the receiving areas 52 is configured to removably receive and contain only one of the workpieces 26. Accordingly, each workpiece 26 mates with only one of the receiving areas 28 on the first page 22 and only one of the receiving areas 52 on the second page 24. Each receiving area 52 on the second page 24 also includes an access portion 46 substantially similar to the access portion 46 on the first page 22.

The receiving areas 52 on the second page 24 are arranged in a pattern different than the pattern of receiving areas 28 on the first page 22. For example, a first receiving area 54 on the second page that mates with the first puzzle piece 36 (the "Happy Birthday" puzzle piece) is located generally at the top, middle portion of the second page, while on the first page the corresponding receiving area 28 (FIG. 4) is in the lower right-hand corner. Similarly, a second receiving area 56 in the second page 24 that mates with the second puzzle piece 38 (the "fire truck" puzzle piece) is located in the middle left portion of the second page 24, while on the first page 22 the corresponding receiving area 28 (FIG. 4) is in the upper left-hand corner. Accordingly, this arrangement or pattern of the receiving areas 28 and 52 in the first and second pages 22 and 24 create a puzzle arrangement that a young reader must solve when moving a workpiece 26 from the first page 22 to the mating receiving area 52 on the second page 24.

Figure 7:
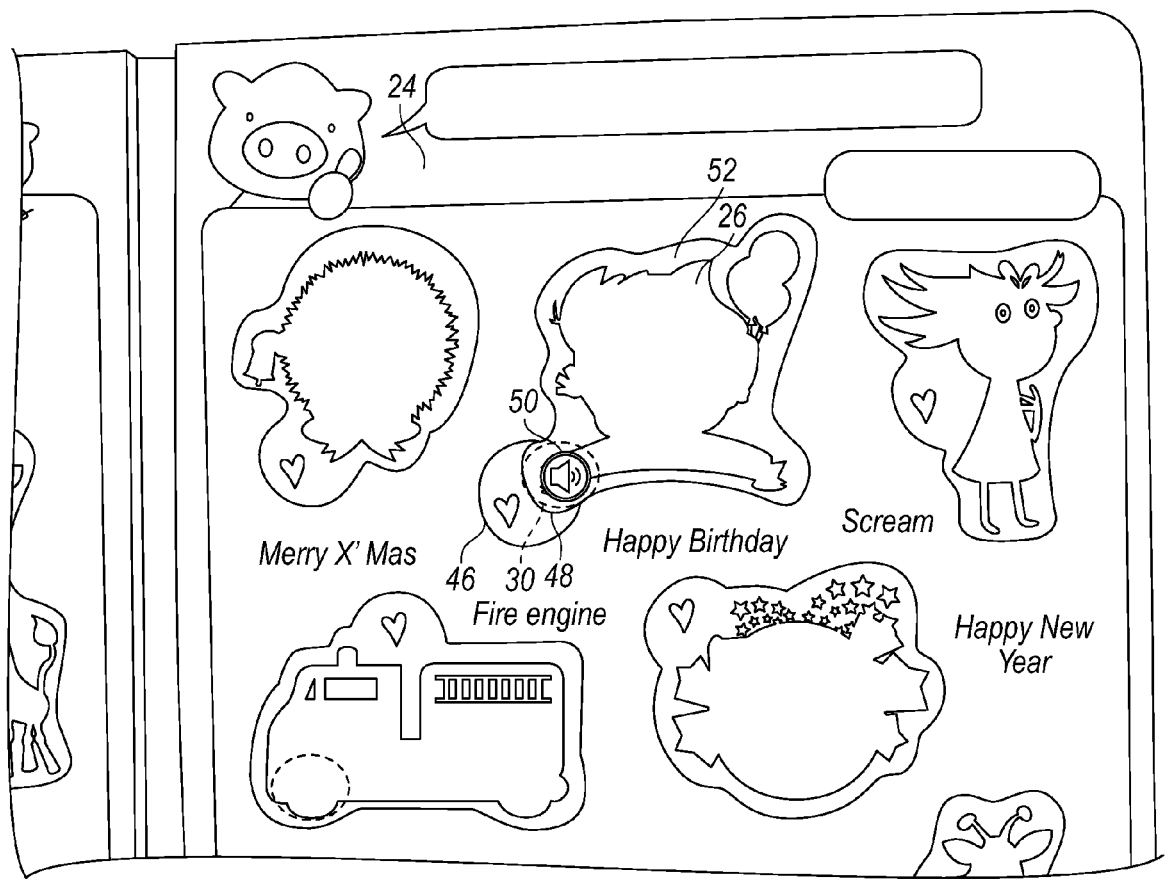
FIG. 7 is an enlarged schematic view of the workpiece of FIG. 6 shown installed in the mating receiving area in the second page.
Figure 8:
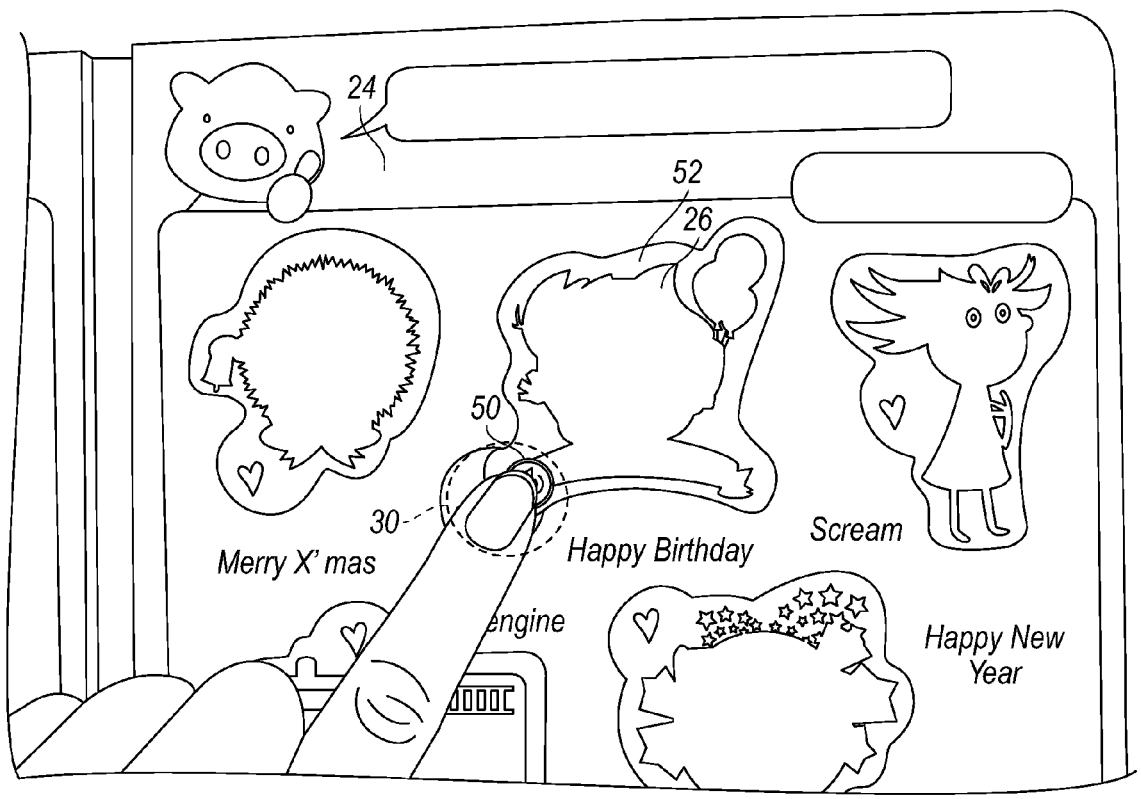
FIG. 8 is an enlarged schematic view a user activating a membrane switch in the second page after installing the workpiece of FIG. 6 in the mating receiving area by pressing the activation indicium on the workpiece.

As indicated above, the second page 24 includes a plurality of the membrane switches 30 embedded therein adjacent to each of the receiving areas 56. In the illustrated embodiment, each membrane switch 30 is positioned relative to a respective second receiving area 52. As seen in FIG. 7, when the workpiece 26 is positioned in the mating receiving area 52 in the second page 24, the activator indicium 50 is immediately adjacent to and aligned with the membrane switch 30 associated with that mating receiving area 52. The membrane switch 30 is configured such that, when the reader presses on the activator indicium 50, as shown in FIG. 8, the associated membrane switch 30 is activated.

The electronics package 32 is configured such that, when each membrane switch 30 is activated, a selected sound is generated through the speaker 34. In the illustrated embodiment, each membrane switch 30 corresponds to a separate sound. Accordingly, when the reader places a workpiece 26 into its mating receiving area 52 on the second page and presses the activator indicium 50, a different sound will be generated for each workpiece. The sound can be a song, a noise corresponding or relating to the image on the puzzle piece, or any other selected sound. The sounds may be different for each workpiece 26, or the sounds may be the same for some or all of the workpieces 26. The sounds made provide audible feedback to the reader. For example, the electronic package may be configured to provide audible encouragement to the reader, such as via a voice that says "Great Job."

In an embodiment, the book 12 can include only the first and second pages 22 and 24. In another embodiment, the book 12 can include multiple pairs of pages, wherein each pair includes a respective first and second page with puzzle pieces or other workpieces 26 that mate with the receiving areas on those first and second pages, substantially as described above. In yet another embodiment, the book 12 may include a first set of receiving areas on one portion of the page and a second set of the receiving areas on a second portion of the page, wherein the workpiece 26 is movable between its mating receiving areas in the first and second portions of the page.

Figure 6:
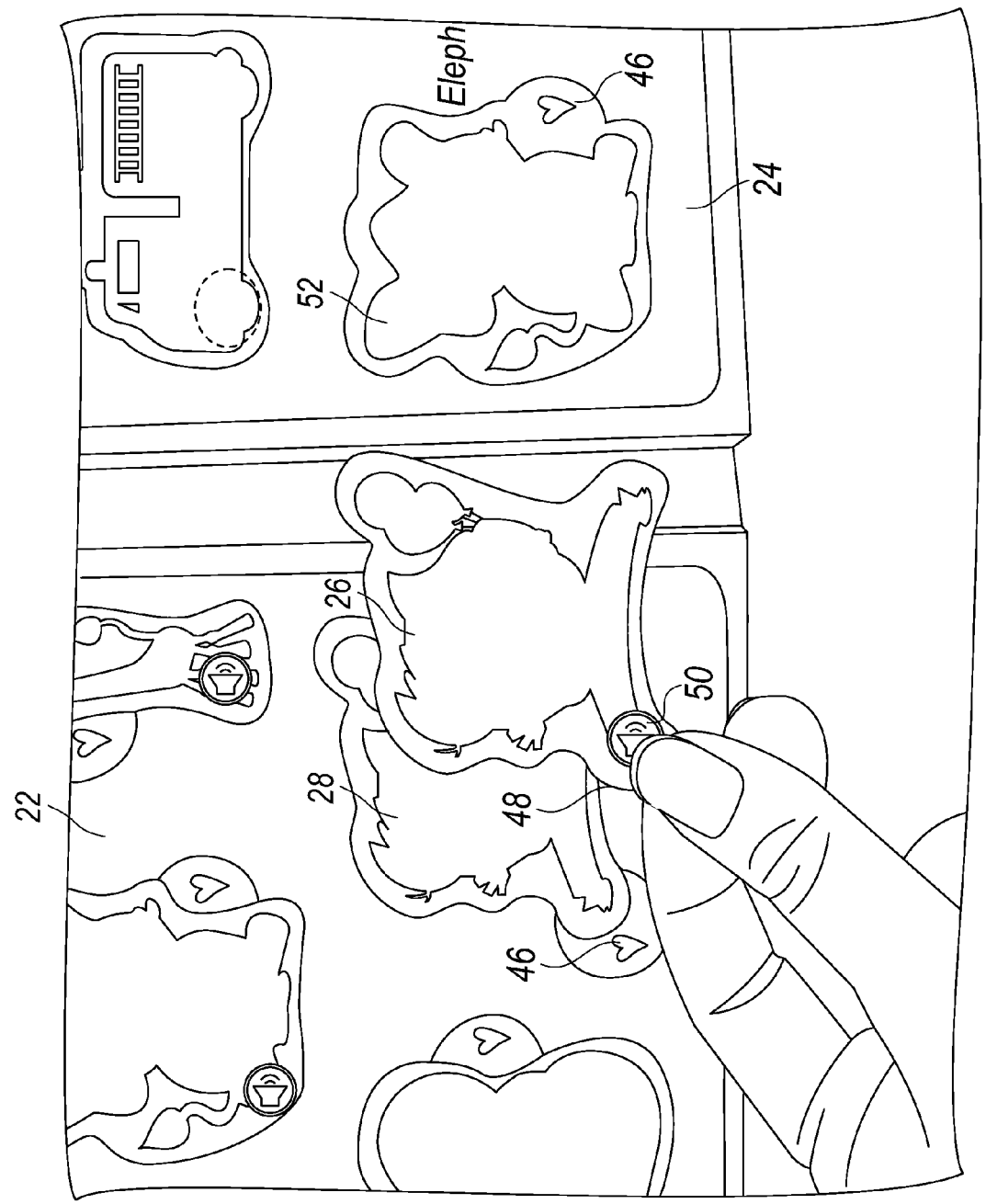
FIG. 6 is an enlarged schematic view of a selected workpiece of FIG. 2 shown removed from the receiving area of the first page.

In operation of the interactive puzzle book 12 described above, the reader starts with all of the workpieces 26 in their respective receiving areas 28 on the first page. The reader selects and removes the workpiece 26 from the first mating receiving area 28 by grasping the workpiece's edge portion 48 from the access portion 46. The reader removes the workpiece, as shown in FIG. 6, and locates the corresponding, mating receiving area 52 on the second page 24. The reader then must properly orient the workpiece 26 relative to the receiving area 52 to position the workpiece 26 with its mating receiving area 52. After the workpiece 26 is properly in place within the receiving area 52, its activator indicium 50 is vertically aligned with or otherwise immediately adjacent to the membrane switch 30 corresponding to the selected receiving area 52, as shown in FIG. 7. The reader can then press the activator indicium 50 on the workpiece 26, thereby activating the membrane switch 30. The electronic package is then activated and, via the circuitry and the processor, generates a selected sound associated with the workpiece 26 and/or the receiving area 52. The sound is generated through the speaker 34 (FIG. 3), thereby providing an audible feedback to the reader.

FIGS. 9-14 illustrate another embodiment of the book assembly 10 in accordance with the present disclosure. In this embodiment, the book assembly 10 includes a calculator puzzle book 60 having a first page 62 with a plurality of first receiving areas 64 that receive workpieces 66 in a manner substantially identical to the discussion above. In the illustrated embodiment, the book 12 simulates a market experience, wherein a first set of the workpieces 66 generally represent, as an example, selected fruit. A second set of the workpieces 66 are configured to generally represent different denominations of money. Each of the workpieces 66 has a different peripheral shape and/or size so as to fit in only one of the receiving areas 64 in the first page 62. Although the example described herein for purposes of illustration refer to "fruit workpieces" 66A and "money workpieces" 66B, the book 60 can be configured with a different storyline and different representative workpieces 66.

Figure 9:
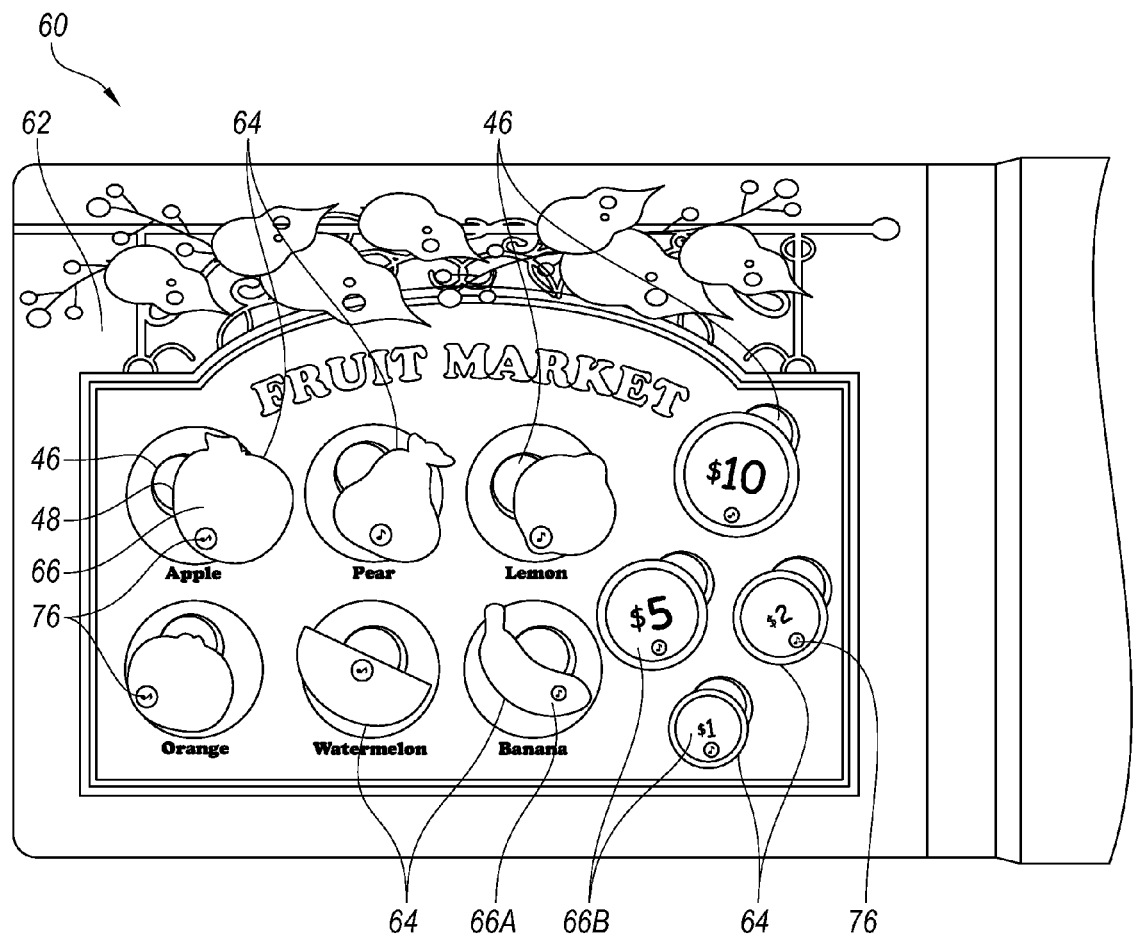
FIG. 9 is a schematic view of a selected first page of an interactive book assembly in accordance with another embodiment, wherein a plurality of uniquely shaped workpieces are shown positioned in mating receiving areas.
Figure 10:
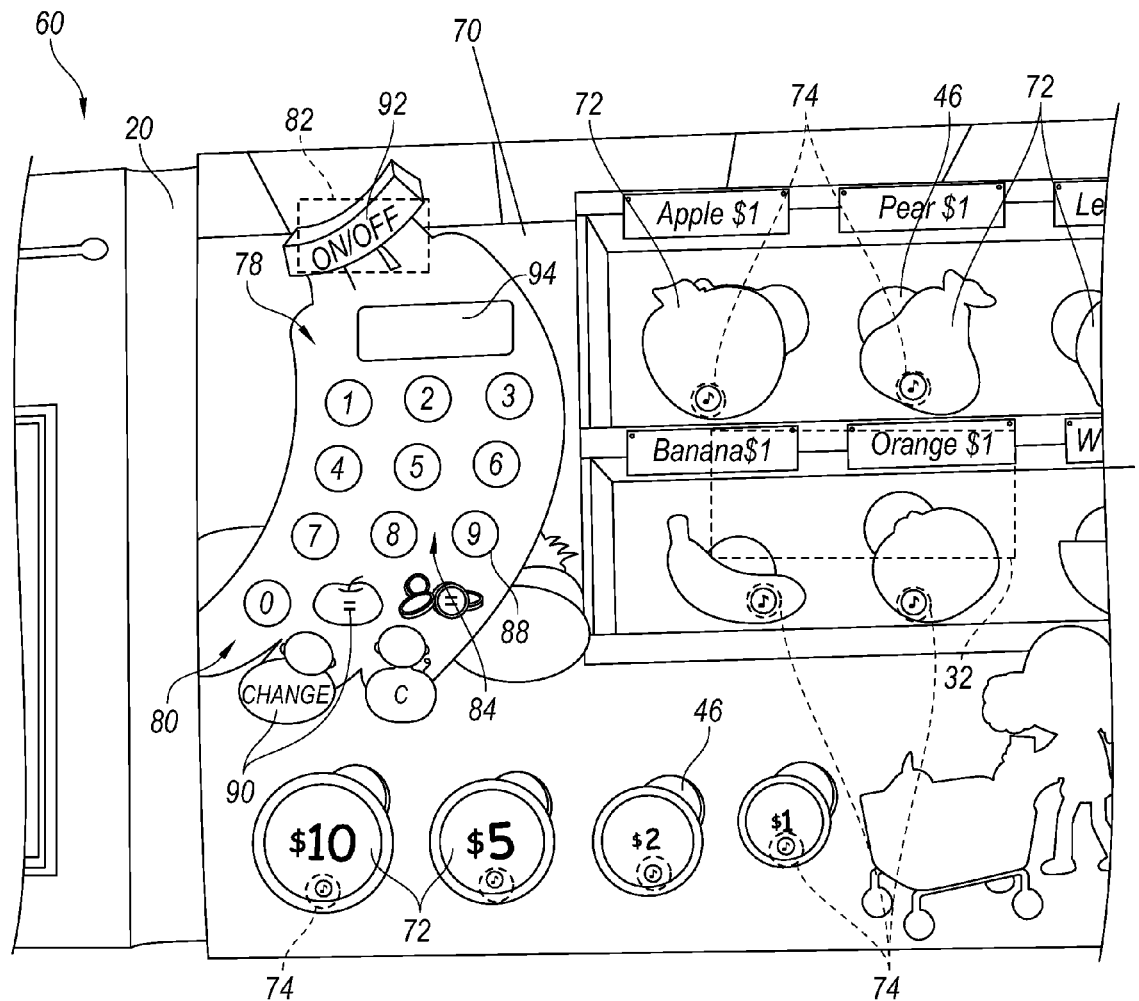
FIG. 10 is a schematic view of a second page of the interactive book assembly of FIG. 9, wherein the second page has an interactive calculating device adjacent to a plurality of uniquely shaped receiving areas shaped to correspond with and receive the mating workpieces.
Figure 11:
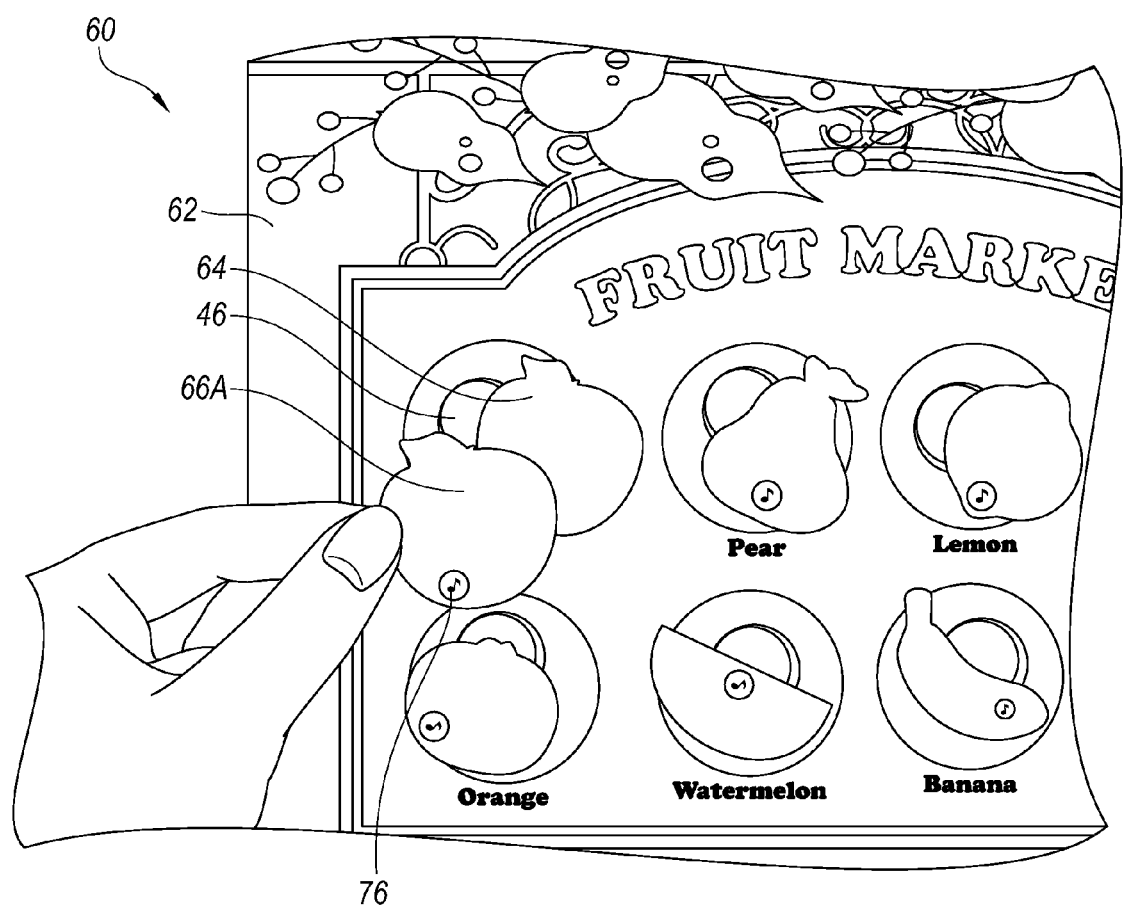
FIG. 11 is an enlarged schematic view of a selected workpiece of FIG. 9 shown of removed from the receiving area of the first page.

As seen in FIG. 10, a second page 70 of the book 60 includes a plurality of second receiving areas 72 that each have a unique peripheral shape and/or size and that correspond to only a respective one of the receiving areas 64 on the first page 62 (FIG. 9). Each of the second receiving areas 72 on the second page 70 is configured to receive and only mate with a respective one of the workpieces 66 in a similar manner as discussed above. In addition, the second page 70 contains a plurality of membrane switches 74 adjacent to the receiving areas 72. In addition, each of the workpieces 66 includes an activator indicium 76 that aligns with the membrane switch 74 at the corresponding receiving area 72 when the workpiece 66 is properly positioned in its mating receiving area 72.

The second page 70 also includes a secondary interactive portion 78 accessible by the reader that relates to the workpieces 66 when positioned in the second receiving areas 72. In the illustrated embodiment, the secondary interactive portion 78 is a calculator 80 operatively coupled to the circuitry, the processor, and the membrane switches of the electronic package 82 associated with the second page 70. The calculator 80 of the illustrated embodiment includes an on/off switch 82, a keypad 84 with a plurality of input keys 86, including "number" keys or switches 88 and function keys or switches 90. The calculator 80 or other secondary interactive portion 78 of other embodiments can be configured with other input features. The second page 70 of the illustrated embodiment includes a plurality of indicia in alignment with the calculator's on/off switch 82 and the input keys 86 that provide an indication to the reader were to press to activate the selected function of the calculator 80. Accordingly, when a reader presses the calculator indicia, the calculator's switch corresponding to the selected input key 86 will be activated to perform the selected operation of the calculator 80.

The calculator 80 is configured to perform calculations in response to the reader's input relating to activation of the membrane switches 74 caused by the reader pressing on the activator indicium 76 on the workpieces 66 positioned in their respective receiving areas 72. The calculator 80 or other secondary interactive portion can be configured for a wide variety of interactions with the reader related to manipulation of the workpieces 66 to provide one or more selected interactive experiences between the book 60 and the reader. The interactive experience can be configured to be an educational experience, although other embodiments can be configured for other selected interactive experiences for the reader.

Figure 12:
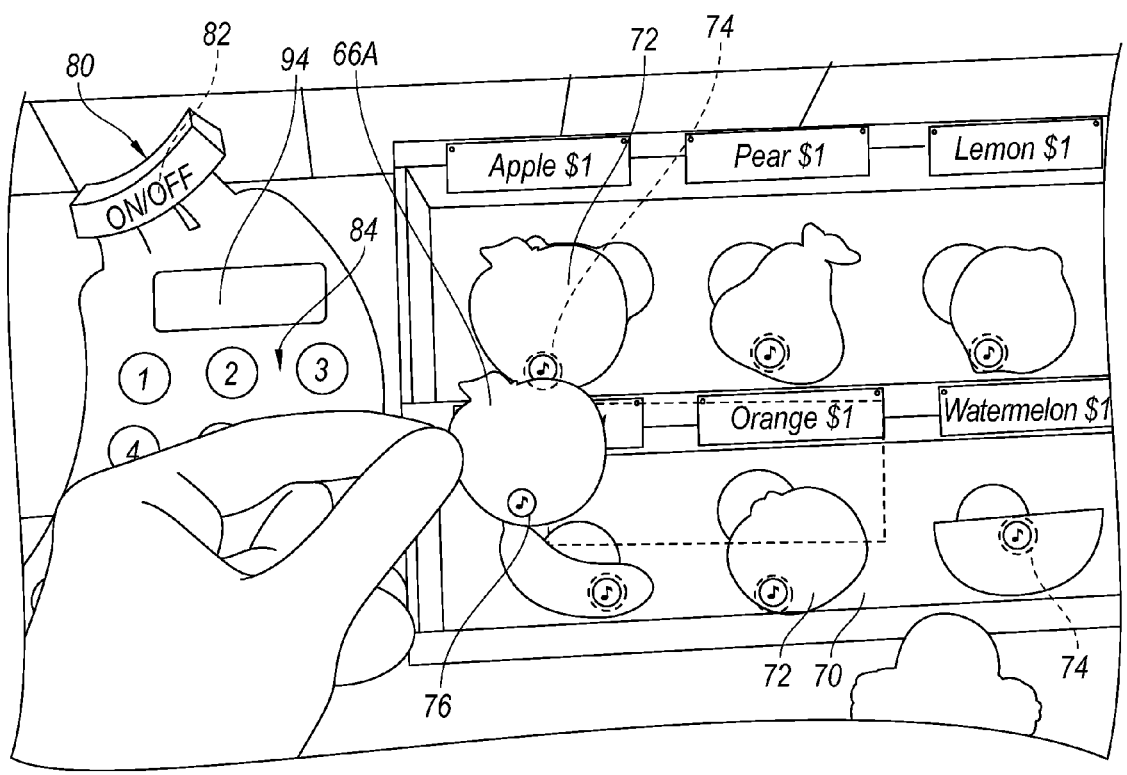
FIG. 12 is an enlarged schematic view of the workpiece of FIG. 11 shown adjacent to a mating receiving area in the second page.
Figure 13:
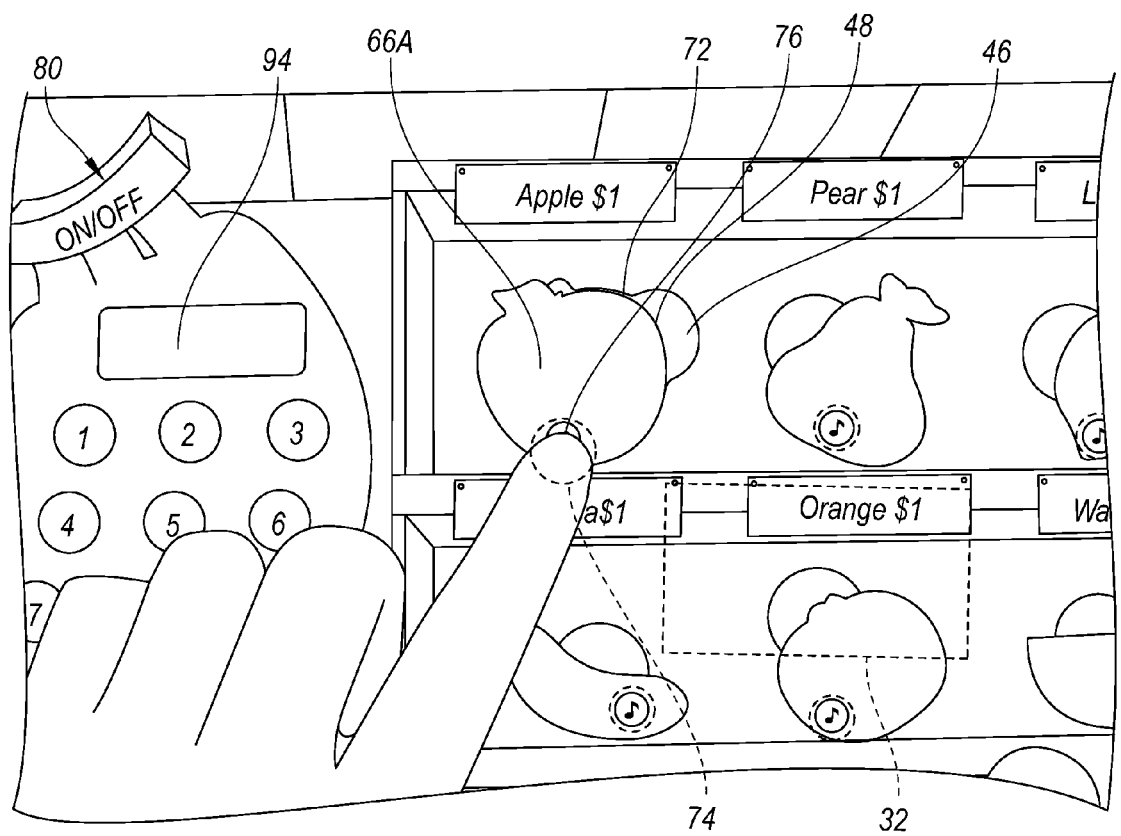
FIG. 13 is a schematic view of a user activating a membrane switch in the second page after installing the workpiece of FIG. 12 in the mating receiving area by pressing the activation indicium on the workpiece.
Figure 14:
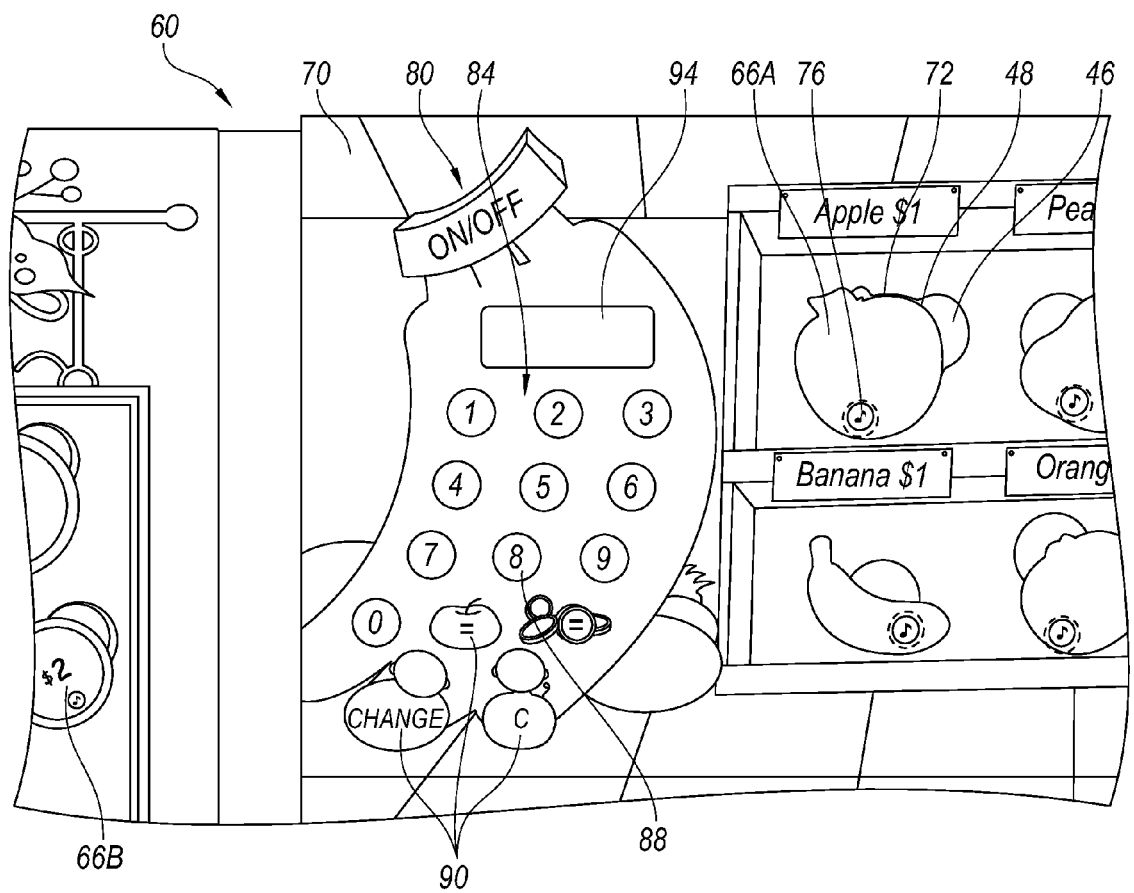
FIG. 14 is a schematic view of the activated calculating device on the second page of the book assembly of FIG. 10.

The following is an example of operation of the book 60 of the illustrated embodiment with the calculator 80. The illustrated embodiment is configured as a simulated market experience, wherein the workpieces 66 include the fruit workpieces 66A and the money workpieces 66B each having unique peripheral shapes or sizes. The interactive experience begins with the reader turning the calculator on by pressing on the "ON/OFF" indicium 92 (FIG. 10) that corresponds to the calculator's "on" switch 82. The reader removes a selected fruit workpiece 66A from its corresponding receiving area 64 in the first page 62 (FIG. 11), and places the selected fruit workpiece 66A in the correct or mating receiving area 72 on the second page (FIGS. 12 and 13). The reader then presses the activator indicium 76 on the workpiece (FIG. 13), thereby activating the corresponding membrane switch 74 and causing the electronic package 32 to generate an audible prompt or other response seeking reader interaction, such as the question, "How many do you want?" In the illustrated embodiment, each workpiece 66 is associated with a selected value, such as a monetary value which is identified on the second page 70 adjacent to the respective receiving area 72 or on the workpiece 66. In response to the audible prompt, the reader then presses a number key 88 on the calculator 80 indicating the selected quantity to be associated with the chosen fruit workpiece 66A. In response, the electronic package generates a follow-up prompt seeking additional reader interaction, such as audibly announcing the number selected by the reader and generating the prompting question, "Any more?"

The calculator 80 and/or the processor is configured to display in the calculator's display area 94 the selected value associated with the chosen fruit workpieces 66A. For example, if the simulated monetary value of the chosen fruit workpiece 66A equals one dollar each and the reader chooses a quantity value of three, the calculator 80 will display the associated value of three dollars. In the event the simulated monetary value associated with the chosen fruit workpieces 66A is two dollars each, as an example, and the reader selects a quantity of three of the chosen fruit workpiece 66A, the calculator 80 would calculate and display the simulated total value of six dollars. Accordingly, the calculator 80 and/or the electronic package 32, can be configured to automatically utilize data associated with the workpieces 66 in the calculations performed by the calculator 80 without additional reader input.

The reader can then repeat the process by selecting another fruit workpiece 66A from the first page 62, and placing the workpiece into the mating receiving area 72 in the second page 70 and pressing the activator indicium 76 to activate the corresponding membrane switch 74. The sequence described above is repeated in connection with the prompting messages and or/display on the calculator. After the reader has finished selecting the desired fruit workpieces 66A and placing them in their mating receiving areas 72 on the second page 70 and activating the corresponding membrane switches, the reader can be prompted to activate a function key 90 on the calculator 80, such as a prompting message "Press equal sign." In response, the total value of the selected workpieces and selected quantity is displayed on the calculator. The calculator and/or processor may be configured to generate another prompting message such as the announcement of the total simulated value of all chosen fruit workpieces 66A and the statement: "Please pay for it."

In response to the interactive "Please pay for it" prompt, the reader selects a money workpiece 66B from the receiving area 64 on the first page 62. The money workpiece 66B in the illustrated embodiment includes a graphical representation of the simulated value associated with that workpiece. The reader places the selected money workpiece 66B into the mating receiving area 72 in the second page 70, and the reader presses the activator indicium 76 on that money workpiece, thereby activating the membrane switch 74 associated with that selected receiving area 72. In response, the electronic package 32 generates an audible interactive prompt, such as the question, "How many?" In response to this audible prompt, the leader can input the desired quantity value of the money workpieces 66B by pressing the corresponding number key 88 on the calculator 80. The leader can repeat the process by selecting additional money workpieces 66B from the first page 62 and placing them into the mating receiving areas 72 on the second page 70 and pressing the activator indicium 76 to activate the corresponding membrane switches 74. The reader can then be prompted to press the "=" function key on the calculator 80, and the calculator will display sum of the simulated "payment" associated with the selected money workpieces 66B. The electronic package 32 can be configured to generate an audible response, such as an announcement of the simulated "payment" value entered by the reader, and an audible interactive prompt, such as "Press change key", to instruct the reader to press the "CHANGE" function key on the calculator 80.

The electronic package 32 or the calculator 80 can determine if the chosen payment value is greater than or equal to the total amount of the value associated with the selected fruit workpieces 66A, and the amount of simulated monetary change due to the reader be shown on the calculator's display. A corresponding audible message can be generated, such as "Your change is three dollars." If, however, the chosen payment value is less than the total amount of the value associated with the selected fruit workpieces 66A, the electronic package 32 is configured to generate an interactive prompting message, such as "You do not have enough money. Please try again." The reader can then repeat the process for selecting the money workpieces 66B, and interacting with the membrane switches 74 and the calculator 80 to complete the simulated market transaction.

The above example provides a simulated market transaction for purposes of explanation. The book assembly 10 can be configured with other workpieces and other storylines associated with the reader interaction to provide a stimulating, educational, entertaining, or otherwise interactive reader experience with the workpieces, the receiving areas, and the secondary interactive portions. Other interactive features can be included in other embodiments that interface with the membrane switches associated with the receiving areas on the books pages to provide a selected interactive user experience.

From the foregoing, it will be appreciated that specific embodiments of the invention have been described herein for purposes of illustration, but that various modifications may be made without deviating from the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

I claim:

1. An interactive puzzle book assembly, comprising:
at least a first page portion and at least a second page portion,
a plurality of workpieces, each workpiece having a unique shape or size compared to the other workpieces, and each workpiece having an indicia area with an activation indicium thereon;
a plurality of switches operatively coupled to the second page portion;
an electronics package operatively coupled to the switches;
the first page portion removably retaining a plurality of workpieces in a plurality of first receiving areas, each first receiving area having a unique shape or size as compared to the other first receiving areas;
the second page portion having a plurality of second receiving areas, wherein each one of the first receiving areas has a corresponding second receiving area, such that for each first receiving area having a shape or size, a respective second receiving area has a corresponding shape and size, each second receiving area having a unique shape or size as compared to the other second receiving areas, and each second receiving area having a shape and size that matches a respective one of the first receiving areas, each second receiving area configured to receive and retain a mating one of the workpieces, and each second receiving area having a switch area located to correspond to the position of the indicia area of the mating workpiece when the mating workpiece is positioned in the respective second receiving area;
the switches positioned with a switch adjacent to the switch area of each second receiving area, such that when a workpiece is placed in its mating second receiving area, the switch associated with the mating second receiving area is aligned with the indicia area, and configured so that when a user presses the activation indicium the workpiece presses against the switch area, causing activation of the associated switch, and when the associated switch is activated, the electronic package generates a sound relating to the workpiece in the second receiving area corresponding to the associated switch.

2. The book assembly of claim 1 wherein the switches are membrane switches.

3. The book assembly of claim 1, further comprising multiple pairs of pages including first and second pages, wherein the first page portion having the first receiving areas is provided on the first page, and the second page portion having the second receiving areas is provided on the second page.

4. The book assembly of claim 1 wherein each of the first receiving areas includes an access portion that exposes an edge portion of the workpiece in the first receiving area.

5. The book assembly of claim 1 wherein each of the second receiving areas includes an access portion that exposes an edge portion of the workpiece when the workpiece is positioned in the second receiving area.

6. The book assembly of claim 1 wherein the first receiving areas are arranged in a first pattern on the first page portion, and the second receiving areas on the second page portion are arranged in a second pattern different than the first pattern.

7. The book assembly of claim 1 wherein each of the workpieces includes workpiece graphics thereon, and each of the first and second receiving areas includes graphics therein that generally correspond to the workpiece graphics.

8. The book assembly of claim 1 wherein the electronic package includes a power source and a speaker that generates a unique sound for each of the workpieces.

9. An interactive book assembly having a plurality of pages, comprising;
a plurality of workpieces, each workpiece having a unique shape and size different than the other workpieces, and each workpiece having an indicia area with an activation indicium thereon;
a first page of the plurality of pages having a plurality of first receiving areas, each of the first receiving areas having a shape and size that corresponds to the shape and size of a respective one of the workpieces, wherein each and every first receiving area matches with only a respective one of the workpieces;
a second page of the plurality of pages having a plurality of second receiving areas formed therein, such that the second receiving areas are a fixed portion of the second page, each of the second receiving areas having a shape and size that corresponds to the shape and size of a respective one of the workpieces, wherein each second receiving area matches with only one of the workpieces and every one of the plurality of workpieces mates with a respective one of the first receiving areas and a respective one of the second receiving areas, each second receiving area being configured to receive a mating workpiece removed from the matching first receiving area; wherein each second receiving area has a switch area positioned to be aligned with the activation indicium on the mating workpiece when the mating workpiece is positioned in the matching second receiving area;
a plurality of membrane switches integrally connected to the second page adjacent to the second receiving areas, each membrane switch positioned adjacent to the switch area of a respective one of the second receiving areas, such that when a mating workpiece is placed in the matching second receiving area, the membrane switch associated with the matching second receiving area is aligned with the indicia area, and configured so that when a user presses the activation indicium the workpiece presses against the switch area, causing activation of the associated membrane switch; and an electronic package coupled to the plurality of membrane switches, the electronic package having a processor, a speaker, power source, and a secondary interaction member operatively coupled to the processor and the membrane switches, wherein the electronic package generates a selected sound upon activation of the associated membrane switch, and the secondary interaction member provides a visual display related to the workpiece located in the second receiving area upon activation of the associated membrane switch.

10. The book assembly of claim 9 wherein each of the first receiving areas has a shape and size substantially identical to a shape and size of a respective one of the second receiving areas.

11. The book assembly of claim 9 wherein each of the first receiving areas includes an access portion that exposes an edge portion of the workpiece in the first receiving area.

12. The book assembly of claim 11 wherein each of the second receiving areas includes an access portion that exposes an edge portion of the workpiece when the workpiece is positioned in the second receiving area.

13. The book assembly of claim 9 wherein the second receiving areas each include an access portion that exposes an edge portion of the mating workpiece when the mating workpiece is positioned in the matching second receiving area.

14. The book assembly of claim 9 wherein each of the workpieces includes workpiece graphics thereon, and each of the first and second receiving areas includes graphics therein that generally correspond to the workpiece graphics.

15. The book assembly of claim 9 wherein the secondary interaction member is a calculator.

16. The book assembly of claim 9 wherein the electronic package is configured to provide audible interaction prompts to a user in response to activation of one or more of the membrane switches.

17. An interactive book assembly having multiple pairs of pages, comprising:
    a plurality of workpieces, each workpiece having a unique shape and size different than the other workpieces, and each workpiece having an activation indicium thereon;
    a first page having a plurality of first receiving areas that releasably contain all of the workpieces;
    a second page having a plurality of second receiving areas configured to receive all of the workpieces, each of the second receiving areas having a shape and size that corresponds to the shape and size of a respective one of the workpieces, wherein each second receiving area matches with only one of the workpieces, each second receiving area being configured to receive and releasably retain a mating workpiece;
    a plurality of membrane switches connected to the second page adjacent to the second receiving areas, each membrane switch having an area smaller than the mating workpiece, and positioned relative to the respective one of the second receiving areas to be aligned with the activation indicium on the mating workpiece when the mating workpiece is placed in the matching second receiving area, wherein when a user presses the activation indicium on the mating workpiece, the mating workpiece activates the associated membrane switch;
    an electronic package coupled to the plurality of membrane switches, wherein the electronic package generates a selected sound upon activation of the associated membrane switch; and
    a secondary interaction member operatively connected to the membrane switches and the electronic package, such that the secondary interaction member electronically provides at least one of an audible, visual, or tactile interactive response related to activation of the associated membrane switch.

18. The book assembly of claim 17 wherein each of the first receiving areas has a shape and size substantially identical to a shape and size of a respective one of the second receiving areas.

19. The book assembly of claim 17 wherein each of the first receiving areas includes an access portion that exposes an edge portion of the workpiece in the first receiving area.

20. The book assembly of claim 17 wherein the secondary interaction member is a calculator.

21. The book assembly of claim 1 wherein the workpiece is larger than the indicia area.

* * * * *